Oct. 10, 1961 — C. A. HUBBARD — 3,003,533
NUT WITH LONGITUDINALLY EXTENDING SPRING TONGUE LOCKING MEMBER
Filed May 9, 1958 — 2 Sheets-Sheet 1
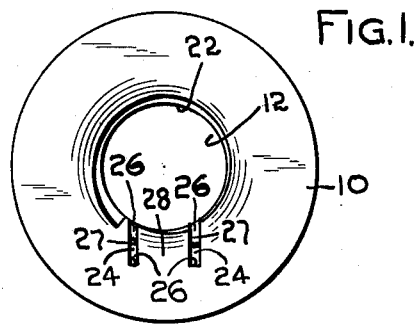
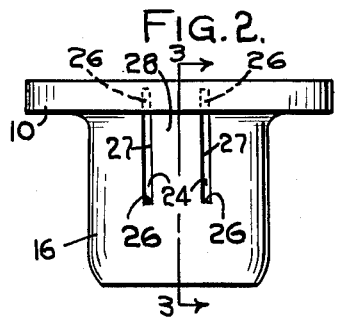
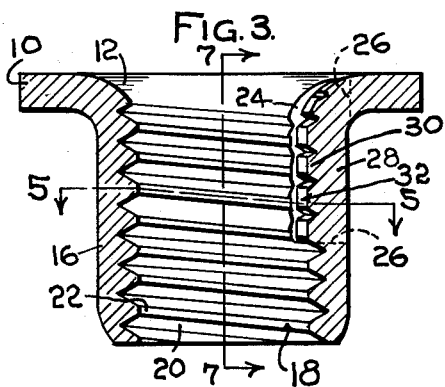
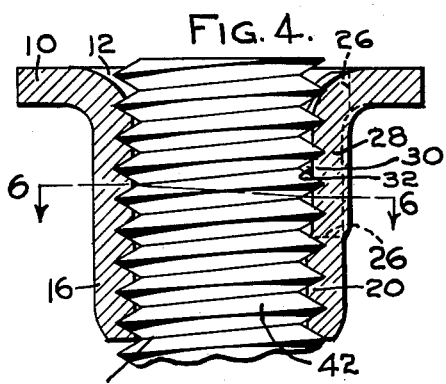
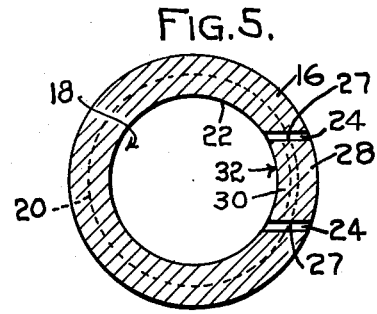
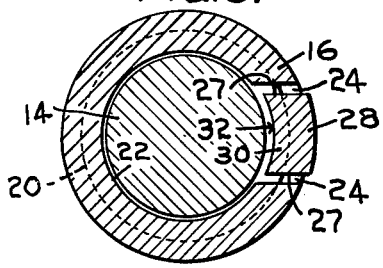
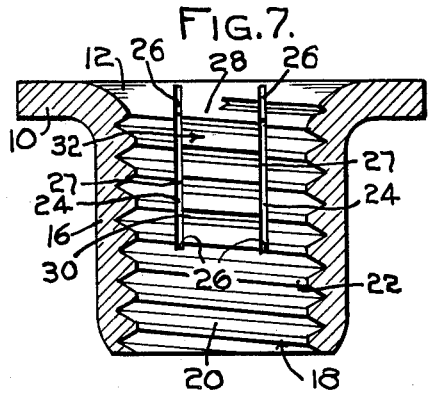
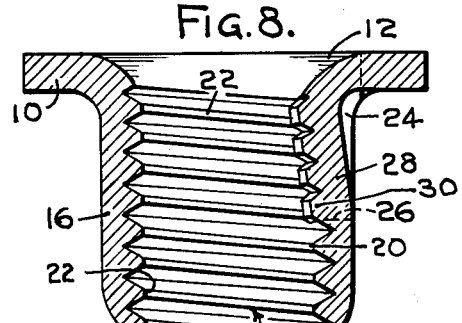
INVENTOR:
CHESTER A. HUBBARD,
By Walter S. Jones
ATTORNEY.

Oct. 10, 1961     C. A. HUBBARD     3,003,533
NUT WITH LONGITUDINALLY EXTENDING SPRING TONGUE LOCKING MEMBER
Filed May 9, 1958     2 Sheets-Sheet 2
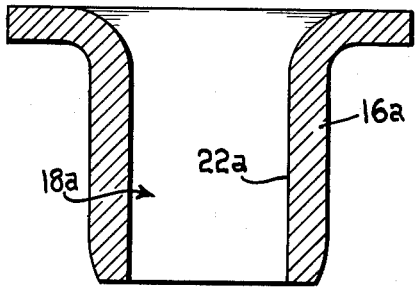
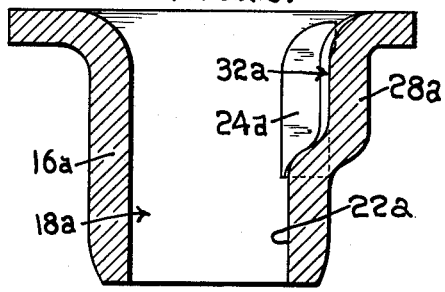
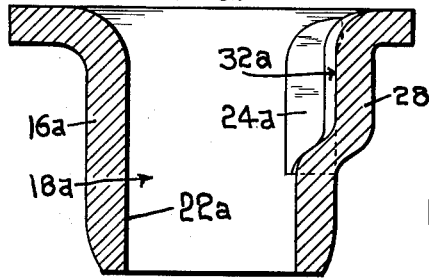
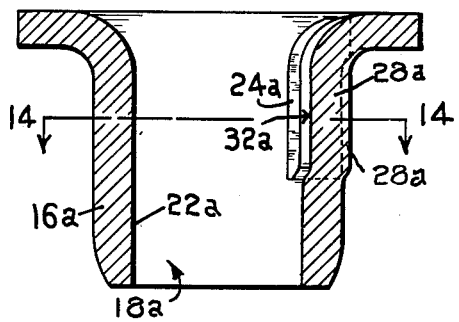
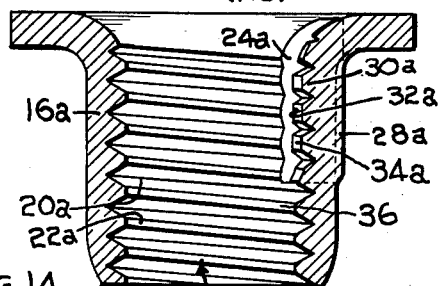
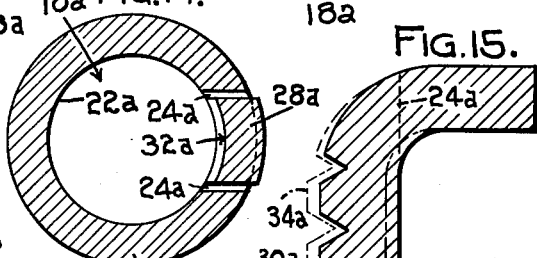
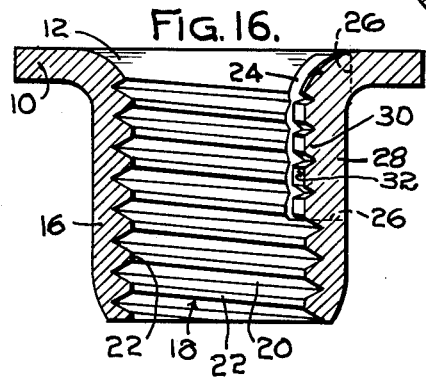
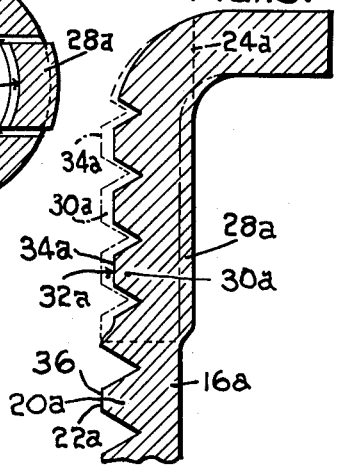
INVENTOR:
CHESTER A. HUBBARD,
BY Walter S. Jones ATTORNEY.

United States Patent Office 3,003,533
Patented Oct. 10, 1961

3,003,533
NUT WITH LONGITUDINALLY EXTENDING
SPRING TONGUE LOCKING MEMBER
Chester A. Hubbard, South Weymouth, Mass., assignor to
United-Carr Fastener Corporation, Cambridge, Mass.,
a corporation of Delaware
Filed May 9, 1958, Ser. No. 734,184
1 Claim. (Cl. 151—21)

The present invention relates to a deformable nut which automatically locks itself when tightened.

The threaded locking devices of this class are of three general forms. One form makes use of a resilient fibrous medium to provide the necessary axial force between the threads of the locking device and a threaded bolt engaged therewith.

In another form, two axially spaced threaded portions having a thread of the same pitch and a resilient portion between the aforesaid portions with threads that are out of phase.

The third form makes use of a resilient free ended tongue separated by slots from the remaining periphery of the barrel of the threaded locking device. The tongue is set to protrude a predetermined distance into the bore. As a threaded bolt is screwed into the bore, the tongue will provide increasing lateral spring tension on the bolt locking it in position.

Applicant's invention combines the best features of a resilient tongue type, out of phase type and a type in which the locking action is supplied by the engagement of different depths of thread to disclose a unique locking nut.

An object of the invention is to provide an adjustable and improved self-locking nut.

Other objects of this invention will, in part, be obvious, and will, in part, appear hereinafter.

In the drawing:

FIG. 1 is a plan view of the T-nut with the slot enlarged embodying the features of the invention;

FIG. 2 is a front elevation of the T-nut shown in FIG. 1;

FIG. 3 is a section taken on line 3—3 of FIG. 2;

FIG. 4 is an enlarged section similar to FIG. 3 with a bolt engaged with the locking T-nut and shown in elevation;

FIG. 5 is a section taken on line 5—5 of FIG. 3;

FIG. 6 is a section taken on line 6—6 of FIG. 4;

FIG. 7 is a section taken on line 7—7 of FIG. 3;

FIG. 8 is an enlarged section of a modified form;

FIG. 9 is a view in section of a blank with a small diameter from which the finished T-nut is formed;

FIG. 10 is a view in section of the blank with slots formed and tongue pushed out;

FIG. 11 is a view in section showing the barrel sized internally;

FIG. 12 is a view in section of the tongue sized externally;

FIG. 13 is a view in section of the barrel threaded;

FIG. 14 is a view in section taken on line 14—14 of FIG. 12;

FIG. 15 is an enlarged view of a portion of the barrel shown in FIG. 13 showing the movement of the threading on the tongue before external sizing and after external sizing, the final position being shown in dot and dash lines;

FIG. 16 is a view similar to FIG. 3.

Referring to the drawings, there is illustrated a locking nut preferably comprising an integral base flange 10, a central opening 12 for receiving a threaded bolt 14, an annular barrel or shank 16 having a bore 18 provided with an axial thread 20 which may be of any form, but is preferably of the type known as Unified National. The wall 22 of the annular barrel 16 is provided with a pair of vertical slots 24, the terminal ends 26 of which are closed as best illustrated in FIGS. 1 and 2. The walls 27 of the slots 24 form two edges of the tongue 28. The annular shank may be one of any of the numerous geometric forms used on nuts of this type, however, I have shown it to be a circular form in my preferred embodiment. The tongue 28 has an axial thread 30 on its inside face 32.

In accordance with the present invention, the lock nut is fabricated from sheet metal such as cold roll steel, aluminum or other suitable stock, the gauge depending upon the particular size of the lock nut to be made. Naturally, some of the less pliable plastics can also be used as the fabrication material. The strip of metal is first subjected to a series of progressive stamping and drawing operations which may be performed by any of several well known machines, such for example, as a progressive die operation, an eyelet machine or a transfer press, any of which may be suitably equipped to form a unitary structure having an annular barrel or shank, an integral base portion preferably in the form of a flange. The completion of the aforesaid operation will produce a blank in the form best illustrated in FIG. 9. The walls 22a of the shank of the blank are then sheared by an appropriate instrumentality from the bore 18a outward to form two slots 24a. This shearing operation tends to force the area between the slots 24a, i.e. the tongue 28a, in a lateral direction away from the bore 18a. At this stage in the fabrication the slots 24a are very narrow and the tongue 28a his little resiliency. The slotted blank is then sized internally to bring the walls of the barrel to their final position as best shown in FIG. 11. During this operation, the walls of the slots 24a are split farther apart allowing the tongue 28a to be pushed toward the bore as is required in a future operation.

The unit thus formed in then tapped or threaded in any conventional manner. By performing the threading operation at this stage with the tongue 28a protruding outwardly from the shank 16a, the threading instrument will cut threads of less depth on the inside face 32a of the tongue 28a than the axial threads 20 and will also create wider lands or crests 34a on the axial threads 30a of the tongue 28a than on the threads 20. The nut is then subjected to an external sizing or setting operation in suitable dies or like instrumentalities effective to contract the tongue 30a forcing the lands 34a of the tongue 30a into line with the lands 36 of the axial threads 20a. This particular operation will also place the threads 30a of the tongue 28a slightly out of phase with the axial thread 20a.

FIGS. 12 through 15 best illustrate the result of the last sizing operation. When a threaded bolt 14 is engaged with the nut at the end furtherest from the base 10, it can be easily threaded into the bore 18 until the threading 42 of the bolt 14 engages the first of the threads 30 of the tongue 28 as the bolt 14 is screwed further into the bore 18 and engages more of the threads 30. Two actions take place simultaneously, the smaller depth of thread on the tongue 28 will cause the bolt 14 to force the tongue away from the bore 18 and will naturally cause the tongue 28 to exert a lateral force on the bolt 14 which will result in a locking action. The fact that the face threads 30 of the tongue 28 are out of phase with the axial bore threads 20 will cause a frictional locking action to take place between the threading 42 of bolt 14 and the threads of the tongue 28 as shown in FIG. 4.

If in a further step of the fabrication the tongue 28 were to be forced at an angle into the bore, these locking actions would be increased to any amount of pressure desired depending on the depth of the threads 30 and the angle of inclination of the tongue 28. This is best illustrated in FIG. 8.

I claim:

A device of the class described having a base, a hollow shank having a bore extending at a substantially right angle from said base, a thread formed internally of said shank for engagement with a threaded bolt or screw, said shank having a tongue formed in its wall to provide a locking member, said tongue having one end integral with said base, an opposite end integral with said shank, and divided from the shank by slots, said tongue having tongue threads on its inside face slightly out of phase with the threads of said bolt, the depth of said tongue threads being less than the depth of the bolt threads.

References Cited in the file of this patent

UNITED STATES PATENTS

| | | |
|---|---|---|
| 1,855,482 | McArthur | Apr. 26, 1932 |
| 2,090,337 | Stoll | Aug. 17, 1937 |
| 2,286,982 | Todd | June 16, 1942 |
| 2,367,259 | Beach | Jan. 16, 1945 |
| 2,454,444 | Poupitch | Nov. 23, 1948 |
| 2,551,102 | Delaney | May 1, 1951 |
| 2,563,162 | Eckenbeck | Aug. 7, 1951 |
| 2,580,745 | Engstrom | Jan. 1, 1952 |
| 2,592,128 | Engstrom | Apr. 8, 1952 |

Since certain other obvious modifications may be made in this device without departing from the scope of the invention, it is intended that all matters contained herein be interpreted in an illustrative and not in a limiting sense.